US008682758B2

(12) United States Patent
Rainwater et al.

(10) Patent No.: US 8,682,758 B2
(45) Date of Patent: Mar. 25, 2014

(54) ACCOUNTING TRANSACTIONS BY LIST

(75) Inventors: Michael Rainwater, Frisco, TX (US); Michael T. Bohn, Celina, TX (US); John Florio, Plano, TX (US)

(73) Assignee: Intuit Inc., Mountain View, CA (US)

( * ) Notice: Subject to any disclaimer, the term of this patent is extended or adjusted under 35 U.S.C. 154(b) by 1167 days.

(21) Appl. No.: 11/388,641

(22) Filed: Mar. 23, 2006

(65) Prior Publication Data

US 2007/0226096 A1 Sep. 27, 2007

(51) Int. Cl.
*G06Q 40/00* (2012.01)
*G07B 17/00* (2006.01)

(52) U.S. Cl.
USPC .............................. 705/35; 705/30

(58) Field of Classification Search
USPC ..................................... 705/30, 35
See application file for complete search history.

(56) References Cited

U.S. PATENT DOCUMENTS

| | | | | |
|---|---|---|---|---|
| 5,335,169 | A * | 8/1994 | Chong | 705/31 |
| 5,649,117 | A * | 7/1997 | Landry | 705/40 |
| 7,263,527 | B1 * | 8/2007 | Malcolm | 705/30 |
| 2004/0030615 | A1 * | 2/2004 | Ling | 705/27 |
| 2005/0102242 | A1 * | 5/2005 | Omidyar | 705/65 |
| 2005/0182709 | A1 * | 8/2005 | Belcsak et al. | 705/38 |
| 2006/0190405 | A1 * | 8/2006 | Weekley et al. | 705/52 |

OTHER PUBLICATIONS

"Microsoft Word XP Mail Merge", Computer Services—Southwest Missouri State University, dated 2002. Internet Archives web publication Mar. 9, 2005.*

Google Groups, "microsoft.public.access.forms", Nov. 17, 2003, http://groups.google.com/group/microsoft.public.access.formsbrowse_thread/thread/89feeb6c6f5eebe0.*

Access 2003 Personal Trainer, CustomGuide, Inc., Published Mar. 2005.*

Microsoft Word (NPL documents entitled "Microsoft Word XP Mail Merge" by Computer Services & Mail Merge: Quick & Easy Labels—Word 2003).*

Microsoft Word (NPL documents entitled "Microsoft Word XP Mail Merge" by Computer Services & Mail Merge: Quick & Easy Labels—Word 2003 & "Microsoft Office Word 2003 Screenshots").*

Google Groups—microsoft.public.access.forms, "Use Multiselect Listbox to Create Multiple Records", Nov. 17, 2003.*

* cited by examiner

*Primary Examiner* — Thomas M Hammond, III
*Assistant Examiner* — John Scarito
(74) *Attorney, Agent, or Firm* — Osha Liang LLP

(57) ABSTRACT

A method and system are provided for processing multiple related financial transactions in a computer-based financial accounting system. The multiple related financial transactions have at least one of a common transaction type, a common transaction date and a common transaction amount. The method steps include receiving one or more of the common transaction date, the common transaction type, and the common transaction amount, receiving a set of parties, each party corresponding to at least one of the plurality of related financial transactions, and generating a plurality of related financial transactions, each related financial transaction of the plurality of generated related financial transactions comprising one of the set of parties and at least one of the common transaction date, the common transaction type, and the common transaction amount.

11 Claims, 3 Drawing Sheets

Checking 120

| Date | Number | Payee/Description | Account 310  140  500 | Payment 160 | Deposit | Balance 170 | Group 520 |
|---|---|---|---|---|---|---|---|
| 10/1/2005 | | John Smith | 4002 - T-shirt Sales | | 10.00 | 10.00 | 1 |
| 10/1/2005 | | Mary Jones | 4002 - T-shirt Sales | | 10.00 | 20.00 | 1 |
| 10/1/2005 | | Dave Schwartz | 4002 - T-shirt Sales | | 10.00 | 30.00 | 2 |
| 10/1/2005 | | Tim Taylor | 4002 - T-shirt Sales | | 10.00 | 40.00 | 2 |
| 10/1/2005 | | Jane Doe | 4002 - T-shirt Sales | | 10.00 | 50.00 | 2 |
| 10/1/2005 | | Mark Mendoza | 4002 - T-shirt Sales | | 10.00 | 60.00 | 3 |
| 10/1/2005 | | Steve Johnson | 4002 - T-shirt Sales | | 10.00 | 70.00 | 3 |
| 10/1/2005 | | Mike Simpson | 4002 - T-shirt Sales | | 10.00 | 80.00 | 3 |
| 10/1/2005 | | Al Borland | 4002 - T-shirt Sales | | 10.00 | 90.00 | 3 |

FIG. 4

Checking

| Date | Number | Payee/Description | Account 600 | Payment | Deposit | Balance 170 | Group |
|---|---|---|---|---|---|---|---|
| 10/1/2005 | | John Smith | 4002 - T-shirt Sales | | 10.00 | 10.00 | 1 |
| 10/1/2005 | | Sales Tax, Texas | 2900 - Sales Tax Payable, TX | 0.80 | | 0.80 | 1 |
| 10/1/2005 | | Mary Jones | 4002 - T-shirt Sales | | 10.00 | 20.00 | 1 |
| 10/1/2005 | | Sales Tax, Georgia | 2901 - Sales Tax Payable, GA | 0.70 | | 0.70 | 2 |
| 10/1/2005 | | Dave Schwartz | 4002 - T-shirt Sales | | 10.00 | 30.00 | 2 |
| 10/1/2005 | | Sales Tax, Missouri | 2902 - Sales Tax Payable, MO | 0.60 | | 0.60 | 2 |
| 10/1/2005 | | Tim Taylor | 4002 - T-shirt Sales | | 10.00 | 40.00 | 2 |
| 10/1/2005 | | Sales Tax, Alabama | 2903 - Sales Tax Payable, AL | 0.50 | | 0.50 | 2 |
| 10/1/2005 | | Jane Doe | 4002 - T-shirt Sales | | 10.00 | 50.00 | 2 |
| 10/1/2005 | | Sales Tax, Minnesota | 2904 - Sales Tax Payable, MN | 0.90 | | 0.90 | 3 |
| 10/1/2005 | | Mark Mendoza | 4002 - T-shirt Sales | | 10.00 | 60.00 | 3 |
| 10/1/2005 | | Sales Tax, Tennessee | 2905 - Sales Tax Payable, TN | 0.65 | | 0.65 | 3 |
| 10/1/2005 | | Steve Johnson | 4002 - T-shirt Sales | | 10.00 | 70.00 | 3 |
| 10/1/2005 | | Sales Tax, Texas | 2900 - Sales Tax Payable, TX | 0.80 | | 1.60 | 3 |
| 10/1/2005 | | Mike Simpson | 4002 - T-shirt Sales | | 10.00 | 80.00 | 3 |
| 10/1/2005 | | Sales Tax, Texas | 2900 - Sales Tax Payable, TX | 0.80 | | 2.40 | 3 |
| 10/1/2005 | | Al Borland | 4002 - T-shirt Sales | | 10.00 | 90.00 | 3 |
| 10/1/2005 | | Sales Tax, Texas | 2900 - Sales Tax Payable, TX | 0.80 | | 3.20 | 3 |

FIG. 5

ACCOUNTING TRANSACTIONS BY LIST

BACKGROUND

The present invention relates to computer-based accounting methods.

Computer-based financial accounting systems have greatly automated the process of documenting and analyzing financial transactions. A user interface of a computer-based financial accounting system is sometimes referred to as a check register screen. Individual financial transactions are arranged in rows, and various columns indicate particular aspects of each financial transaction. For example the transaction dates can be arranged in a column, while corresponding transaction reference numbers and transaction types can be arranged in columns. The reference number is a unique identifier for the transaction. The transaction type may reflect the nature of the transaction, for example, a bill payment (BILLPMT), a payroll check (PAY CHK), and other transaction types. An account column can provide information about a particular vendor, payee, customer etc. that may be a party to the transaction. For example, a particular vendor can be indicated for particular financial transaction. A transaction category may also be indicated under a column for a financial transaction, for example, a credit card transaction. This enables tracking of expenses according to the various transaction categories. A payment column can indicate the amount of the transaction, and a balance column can indicate a running balance in the account.

In many cases, it is useful to execute the same financial transactions for a large number of parties at the same time. For example, during a membership drive for an organization such as a club, it is common for hundreds of persons to join the organization, each paying the same fee for the same type of transaction. Conventionally, a financial bookkeeper might need to separately enter each such transaction. In addition to entering the party, type and amount of each transaction, the bookkeeper may also need to repetitively enter taxable status and other information.

SUMMARY

In various embodiments, the present invention provides methods and systems for processing multiple related financial transactions in a computer-based financial accounting system. In one embodiment, a user interface is adapted to receive the common transaction type, date and amount. The user interface also displays a list of candidate parties for the related financial transactions. The user can select parties for the related financial transactions from this list, and can then apply the transaction. This causes a separate transaction to be automatically generated and optionally stored for each party, such as a payee. Such automatic generation can save the user substantial time. The candidate parties' information can be stored in a local data base, or can be accessed externally via a network. Such information can include an active/inactive status, such that only currently active parties are displayed in the above list.

In another embodiment, the user can apply an automatic sales tax calculation to each of the multiple related financial transactions. This can be accomplished, for example, by automatically consulting a tax rate such as a state or local sales tax rate for each party. The tax rate information may be obtained in a manner similar to that described above for other of the parties' information. Such automatic tax calculation can save the user additional time.

According to another embodiment, once the multiple related financial transactions have been generated and stored, they may be displayed, for example, according to a check register format. This allows concise presentation and review of the transaction information. The check register display can include unrelated financial transactions in addition to the multiple related financial transactions. The unrelated transactions can be visually distinguished from the multiple related transactions, for example, by shading or color highlighting. In addition, the check register display can provide a user interface for efficiently editing the displayed transaction information.

In another embodiment, some or all of the multiple related financial transactions can be assigned to a group. If one transaction of a group is edited, for example as described above, the other transactions of the group can optionally and automatically be likewise edited. This can help manage large groups of related financial transactions and afford the user additional time savings.

In yet another embodiment, some or all of the multiple related financial transactions can be separated or otherwise disassociated from a group. This can disallow automatic editing of the disassociated transactions as part of the group, or can allow them to be edited separately.

BRIEF DESCRIPTION OF THE DRAWINGS

FIG. 4 is an illustration of one embodiment of a user interface for displaying multiple financial transactions created using a list.

FIG. 5 is another illustration of one embodiment of a user interface for displaying multiple financial transactions created using a list.

One skilled in the art readily recognize from the following discussion that alternative embodiments of the structures and methods illustrated herein may be employed without departing from the principles of the invention described herein.

DETAILED DESCRIPTION OF THE EMBODIMENTS

Figure 1:
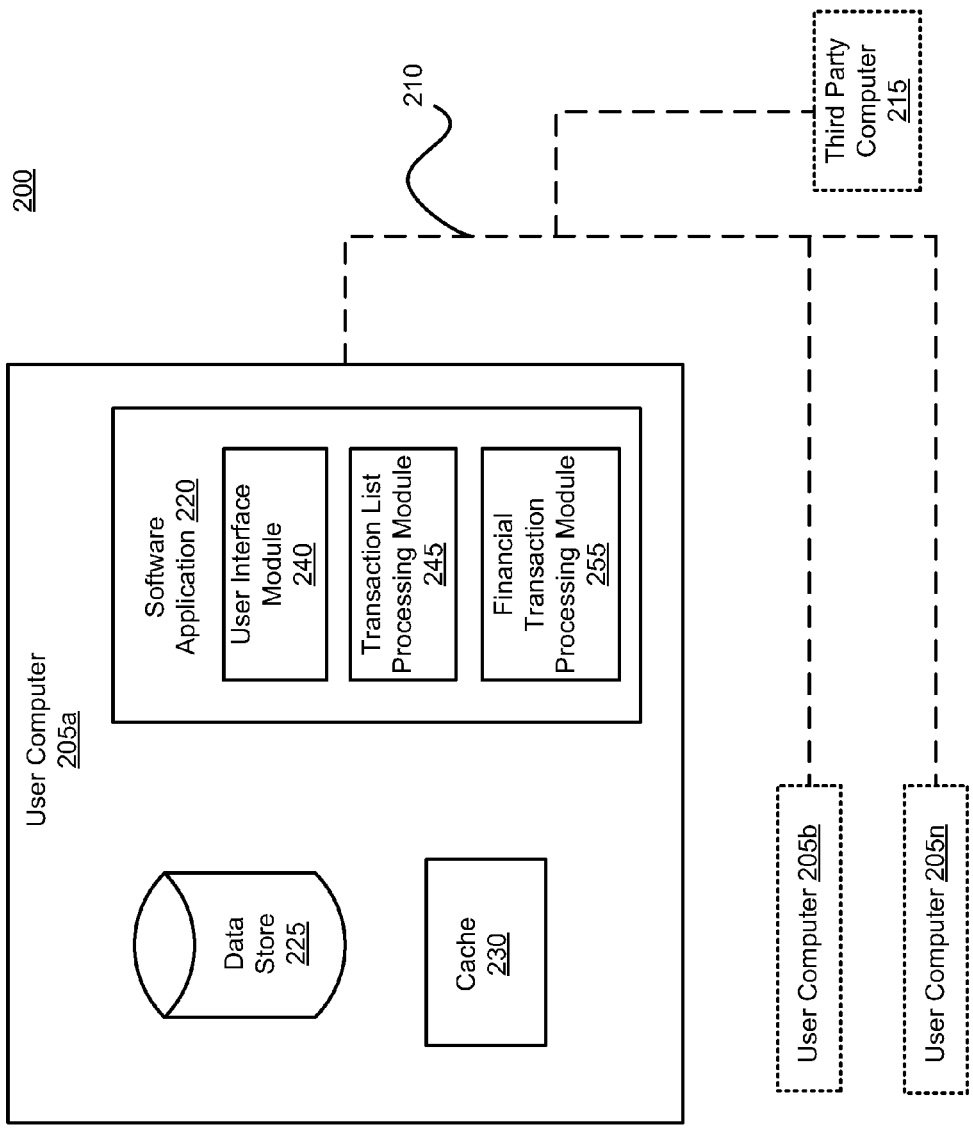
FIG. 1 is a system environment that supports one embodiment of the invention.

According to one embodiment, the present invention provides a user interface, method and system for entering multiple financial transactions into a financial accounting system according to a list. FIG. 1 is a block diagram illustrating the architecture of one embodiment of a system 200 useful for supporting a software application 220 for such a user interface and method. In system 200, there is provided at least one user computer 205a, which may be a stand-alone device or may be communicatively coupled to a network 210 and/or one or more third party computers 215, as indicated by dotted lines.

The user computer 205a is of conventional design, and includes a processor, an addressable memory, and other conventional features (not illustrated) such as a display, local memory, input/output ports, and a network interface. In other embodiments one or more of the components of the user computer 205a may be located remotely and accessed via a network, e.g., 210. The network interface and a network communication protocol provide access to network 210 and other computers, such as other user computers 205b-n or third party computers 215, along with access to the Internet, for example via a TCP/IP type connection, or to other network embodiments, such as a LAN, a WAN, a MAN, a wired or wireless network, a private network, a virtual private network, or other networks. In various embodiments the user computers 205 may be implemented on a computer running a Microsoft operating system, Mac OS, various flavors of Linux, UNIX, Palm OS, and/or other operating systems.

The third party computers 215, if present, also may be computer systems, similar to the user computer described above. For example, one embodiment of a third party computer 215 is a financial institution computer system which provides financial transaction information or processing. The financial institution could be a securities brokerage company, a bank or credit union, a credit card company. In this embodiment, the user software application 220 described herein may be a financial management software application capable of communicating with the financial institution computer system to access information from pre-existing user accounts (for example, to obtain account names or financial transaction data), and provide payment instructions (for example, for making payments to vendors).

The user computer 205 includes a software application 220, data store 225, and data cache 230. The software application 220 includes a number of executable code portions and data files. These include user interface module 240 for creating and supporting a user interface according to one embodiment of the present invention. In other embodiments, the software application 220 can also be implemented as a stand-alone application outside of a financial management software package.

The software application 220 is responsible for orchestrating the processes performed according to the methods of the present invention. The software application 220 includes a transaction list processing module 245 according to one embodiment of the present invention.

The transaction list processing module 245 enables the system 200 to automatically generate and store multiple related financial transactions having a common transaction date, type and amount, based on a list of parties to the transactions. The transaction list processing module 245 is one means for managing multiple financial transactions according to such common information and list of parties.

In other embodiments, the software application 220 can also include a financial transaction processing module 255 that can generate and arrange storage for individual financial transactions. The above software portions 245-255 need not be discrete software modules. The software configuration shown is meant only by way of example; other configurations are contemplated by and within the scope of the present invention.

The software application 220 may be provided to the user computer 205 on computer readable media, such as a CD-ROM, diskette, or by electronic communication over the network 210 from one of the third party computers 215 or other distributors of software, for installation and execution thereon. Alternatively, the software application 220, data store 225, and data cache 230 can be hosted on a server computer, and accessed over the network 210 by the user, using for example a browser interface to the software application 220.

The data store 225 may be a relational database or any other type of database that stores the data used by the software application 220, for example account information in the financial management application embodiment referenced above. The data store 225 may be accessible by the software application 220 through the user interface module 240. Some data from the data store 225 may be added to the data cache 230 upon initialization of the software application 220. The software application 220 and the data store 225 may be stored and operated on a single computer or on separate computer systems communicating with each other through a network 210.

The data cache 230 is a standard cache of small, fast memory holding recently accessed data. The data cache 230 may include, for example, one or more lists of elements according to one embodiment of the present invention.

One skilled in the art will recognize that the system architecture illustrated in FIG. 1 is merely exemplary, and that the invention may be practiced and implemented using many other architectures and environments.

A number of types of information regarding financial transactions will be discussed below. Such information can include, for example, the names and other information regarding parties such as vendors or customers, account names such as general ledger accounts, sales tax rates for parties such as state sales tax rates, grouping assignments, active/inactive status and so on. It will be understood that such information, as well as the financial transactions themselves, can be stored and maintained as necessary in any suitable entity described above, such as data store 225, cache 230, third party computer 215 or computer readable storage medium as described below.

Figure 2:
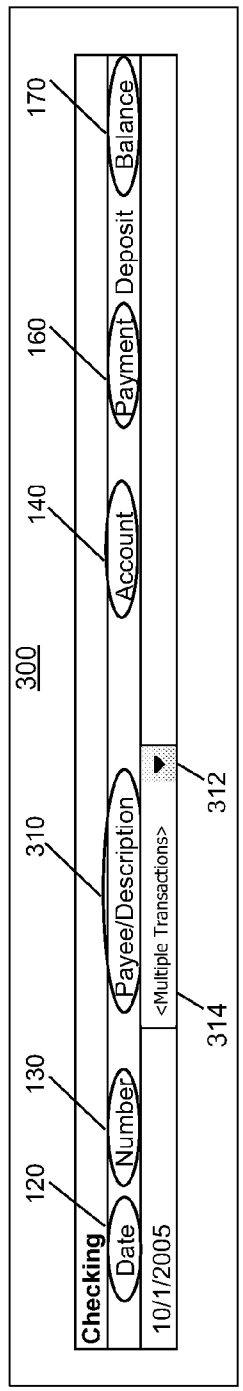
FIG. 2 is an illustration of one embodiment of a user interface for initiating the entering of multiple financial transactions.
Figure 3:
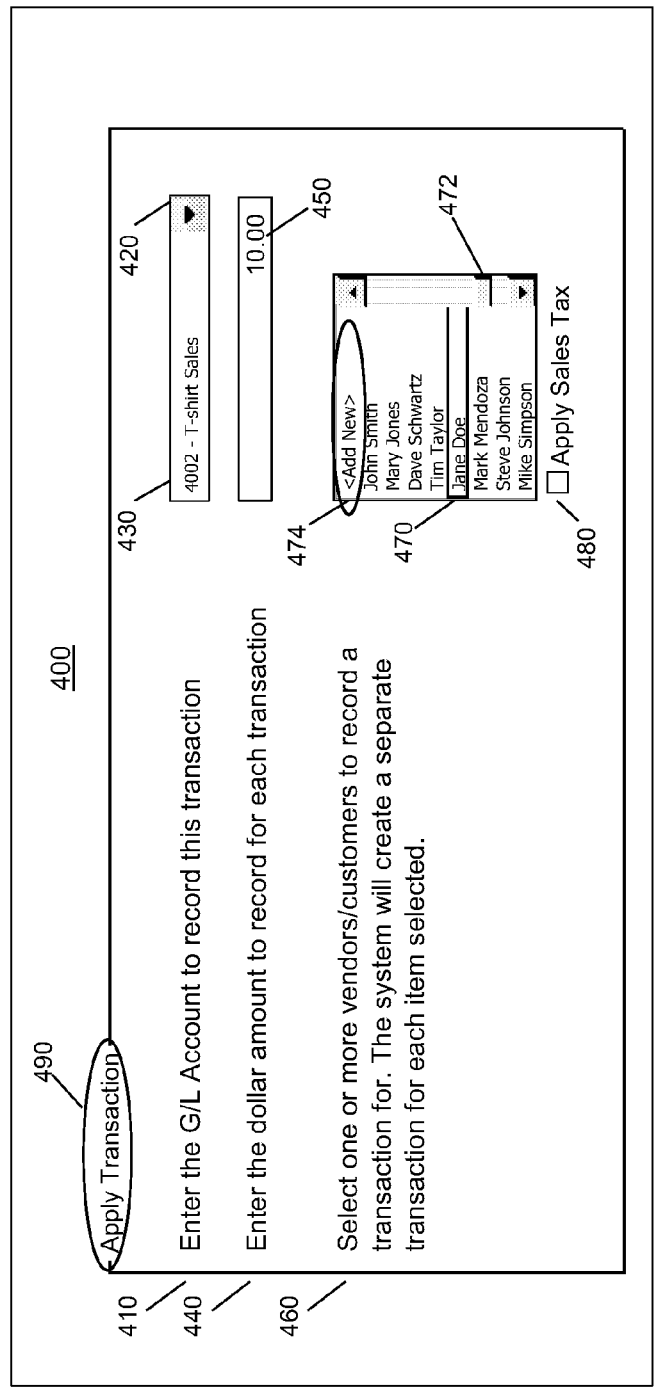
FIG. 3 is an illustration of one embodiment of a user interface for creating multiple financial transactions using a list.

According to one embodiment, user interface module 240 provides a user interface 300 for entering multiple related transactions, as shown in FIG. 2. User interface 300 provides several user interface elements, including fields for entry of the common transaction date, account and payment amount. User interface 300 also includes a Payee/Description column 310. In this embodiment, payees correspond to parties as discussed above. Under column 310 is a dropdown button 312. Selecting this button cause a list of parties such as a vendor/customer list to display (not shown). Within the displayed vendor/customer list is a field labeled, for example, "Multiple Transactions." Selecting this field causes "Multiple Transactions" to appear in field 314, and invokes dialog 400, shown in FIG. 3.

According to this embodiment, a prompt 410 directs the user to click dropdown button 420, which causes a list of account names, for example, general ledger (G/L) accounts (not shown) to display. The user may then select a G/L account, which then displays in field 430. Alternately, the user may directly enter the account name into field 430. Another prompt 440 directs the user to enter into field 450 the dollar amount for each of the related financial transactions. Prompt 460 directs the user to enter one or more parties (for example, vendors and/or customers) for the multiple related financial transactions using list 470.

The user may select the parties from list 470 in a variety of ways, for example, holding the Shift or Control key on the keyboard and clicking on the desired parties. Scroll button 472 may be used to scroll through list 470. Simultaneously holding the Control and "A" keys can cause all of the parties in list 470 to be selected. A variety of other entry methods may be equivalently used, e.g., specifying or selecting customer numbers, specifying a file from which to read a list of parties, and so on. List 470 can include an <Add New> entry 474. Clicking on this entry causes a text entry field (not shown) to display, allowing the user to add a name to list 470.

The parties displayed in list 470 can be selected from a database of parties in whole or in part. For example, each party could be assigned an active or inactive status, and only active parties could be displayed in and selected from list 470. Persons skilled in the art will appreciate that a number of other variations can be used to tailor the parties represented in list 470.

According to one embodiment, dialog 400 includes an Apply Sales Tax field or button 480. Clicking this causes a sales tax to be determined uniquely for each related transaction, according to each party's sales tax rate. Additional aspects of sales tax determination are discussed below. Additional functionality can optionally be added to dialog 400. For example, the user could select an option to group a subset of the multiple related financial transactions by parties. Accordingly, a set of multiple related financial transactions sharing common dates, payment amounts and G/L accounts could comprise multiple groups, each group including transactions of a subset of the parties selected from list 470. Additional aspects of group assignment and management are discussed below.

When the user has completed the desired operations within dialog 400, the user can click "Apply transaction" 490. This causes a separate transaction to be created and saved for each party selected from list 470 as discussed above. The newly created transactions can be saved in data store 225 or cache 230 of one or more computers 205, or optionally within third party computer 215. The user may then click "OK" (not shown) to exit dialog 400. Alternately, the user may simultaneously cause the transactions to be created and saved, and dialog 400 to be closed, by simply clicking OK. At any time dialog 400 is open, the user can exit and cancel any selections or specifications not applied by clicking a "Cancel" button (not shown).

Once the newly created transactions are saved as discussed above, they can be viewed in a check register screen, such as screen 500 shown in FIG. 4. The multiple related financial transactions 510 are arranged in rows, and reflect the information entered in user interface 300 and dialog 400, as discussed above. Check register screen 500 includes a number of columns, including those discussed above regarding check register screen 100 and user interface 300. For example, column 170 shows a running balance that represents an accumulation of the payment entries of column 160. Check register screen 500 can optionally include a Group column 520 that displays group assignments, if any, that were made as discussed above. In exemplary check register screen 500, each of the related transactions 510 has been assigned to one of three groups as shown.

The present invention can facilitate editing as well as entering individual or multiple related financial transactions within computer-based financial accounting systems. According to one embodiment, the user can click on an entry under any of columns 120, 140, 160, 170 or 310 of check register 500, for example, entry 530. Doing so can cause a dialog to display (not shown) that allows editing any of the corresponding entries of the respective transaction. If the transaction has been assigned to a group, the user can optionally be queried whether only the selected transaction should be edited, or whether all transactions of the same group should be automatically edited likewise. The user can also simultaneously edit all transactions of a group by clicking the group number under column 520. For example, clicking group number 540 could cause a dialog (not shown) to display that could allow editing the information in any of columns 120, 140, 160 and 520 for all entries of group 3 (including assigning a different group number). This dialog could optionally also allow the user to edit one or more names under column 310 within the chosen group using, for example, a list similar to list 470.

According to one embodiment, if the user selected Tax field or button 480 of dialog 400 as described above, a tax, such as a sales tax, can automatically be added to the payments 160 of the generated transactions 510. Optionally, additional tax-related transactions can be created and displayed, as shown in the exemplary check register screen 600 of FIG. 5. The first transaction 610a represents a payment made, excluding sales tax. Transaction 610b represents a corresponding sales tax. A tax transaction such as transaction 610b can be calculated based on a tax rate for the party's state, for example, Texas. Such tax rate information can be stored in a database hosted in data store 225, cache 230, read from third party computer 215 via network 210, or obtained by other means. Balance column 170 of check register screen 600 reflects the tax calculations of the tax-related transactions as shown.

It will be appreciated that while the exemplary check registers 500 and 600 show only multiple related financial transactions, variations are possible that can include unrelated transactions. For example, dialog 400 could be invoked to add a set of multiple related financial transactions to one or more separately-entered unrelated financial transactions. Similarly, unrelated financial transactions could be added to existing or separately-entered related transactions. Related and unrelated transactions within a check register such as check registers 500/600 could be visually distinguished, for example, by color highlighting, shading or other means.

According to one embodiment, multiple accounts and amounts can be specified by the user, such that the multiple related financial transactions created are not limited to a single amount or a single account. In addition, multiple related financial transactions can be created without directly specifying an account or amount. For example, a user can specify quantities of one or more items from a catalog to be sold, thereby creating a set of related financial transactions. Prices can be applied to the individual financial transactions on a per-customer basis using business rules stored within, or accessible by, the accounting system. Appropriate corresponding tax transactions can be automatically created using such rules. Thus, the user need not individually enter or calculate either the pricing or the tax amounts.

The present invention has been described in particular detail with respect to one possible embodiment. Those of skill in the art will appreciate that the invention in general may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing, device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Such a computer program may also be accessed from a server, such as third party computer 215, over a network, such as network 210. The computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

What is claimed is:

1. A method, comprising:
    receiving, via a user interface, a common transaction date, a common transaction type, and a common transaction amount, wherein the common transaction date consists of an exact same date of a year;
    receiving, via the user interface, a plurality of parties selected from a list of candidate parties to create a financial transaction for each of the selected parties;
    receiving, via the user interface, a specification that assigns each financial transaction being created for a subset of the selected parties to a first group of at least one group;
    simultaneously creating, via a software application, said financial transaction for said each of the selected parties;
    displaying, via a check register screen, the created financial transactions wherein each created financial transaction includes fields comprising the common transaction date, the common transaction type, and the common transaction amount;
    in response to a user clicking a field of a first financial transaction of the displayed financial transactions, displaying a dialog box to allow editing of any field of the first financial transaction;
    editing, via the dialog box, one or more fields of the first financial transaction wherein the first financial transaction is assigned to the first group of the at least one group;
    querying the user whether every financial transaction assigned to the first group should be edited like the first financial transaction;
    receiving a command to edit said every financial transaction assigned to the first group like the first financial transaction; and
    responsive to the received command, simultaneously editing said every financial transaction assigned to the first group like the first financial transaction.

2. The method of claim 1, further comprising:
    receiving, prior to simultaneously creating said financial transaction for said each of the selected parties, another specification to apply a sales tax to each financial transaction, wherein each created financial transaction comprises a tax amount determined by applying a tax rate to the received common transaction amount, wherein the tax rate applied to each financial transaction is based on its corresponding selected party.

3. The method of claim 1, further comprising:
    receiving another specification that a party of the candidate parties has an inactive status and excluding the party with the inactive status from the list of candidate parties.

4. The method of claim 1, further comprising:
    receiving another specification that a party of the candidate parties has an active status and including the party with the active status in the list of candidate parties.

5. The method of claim 1, further comprising:
    storing the created financial transactions.

6. A non-transitory computer readable medium, embodying instructions executable by a computer, the instructions when executed cause said computer to:
    receive, via a user interface, a common transaction type, a common transaction date, and a common transaction amount, wherein the common transaction date consists of an exact same date of a year;

receive, via the user interface, a plurality of customers selected from a list of candidate customers to create a financial transaction for each of the selected customers;

receive, via the user interface, a specification that assigns each financial transaction being created for a subset of the selected customers to a first group of at least one group;

simultaneously create, via a software application, said financial transaction for said each of the selected customers;

display, via a check register screen, the created financial transactions wherein each created financial transaction includes fields comprising the common transaction date, the common transaction type, and the common transaction amount;

in response to a user clicking a field of a first financial transaction of the displayed financial transactions, display a dialog box to allow editing of any field of the first financial transaction;

edit, via the dialog box, one or more fields of the first financial transaction wherein the first financial transaction is assigned to the first group of the at least one group;

query the user whether every financial transaction assigned to the first group should be edited like the first financial transaction;

receiving a command to edit said every financial transaction assigned to the first group like the first financial transaction; and responsive to the received command, simultaneously edit said every financial transaction assigned to the first group like the first financial transaction.

7. The non-transitory computer readable medium of claim 6, the instructions when executed further cause said computer to:

receive, prior to simultaneously creating said financial transaction for said each of the selected customers, another specification to apply a sales tax to each financial transaction, wherein each created financial transaction comprises a tax amount determined by applying a tax rate to the received common transaction amount, wherein the tax rate applied to each financial transaction is based on its corresponding selected customer.

8. The non-transitory computer readable medium of claim 6, the instructions when executed further cause said computer to:

receive another specification that a customer of the candidate customers has an inactive status and exclude the customer with the inactive status from the list of candidate customers.

9. The non-transitory computer readable medium of claim 6, the instructions when executed further cause said computer to:

receive another specification that a customer of the candidate customers has an active status and include the customer with the active status in the list of candidate customers.

10. The non-transitory computer readable medium of claim 7, the instructions when executed further cause said computer to:

display, in the check register screen, one or more unrelated transactions, each unrelated transaction of the one or more unrelated transactions comprising a unique combination of customer, transaction date, transaction type and amount.

11. The non-transitory computer readable medium of claim 10, the instructions when executed further cause said computer to:

visually distinguish the displayed one or more unrelated transactions from the created financial transactions in the check register screen.

* * * * *